US012620071B2

(12) United States Patent
Jeon et al.

(10) Patent No.: US 12,620,071 B2
(45) Date of Patent: May 5, 2026

(54) METHOD FOR CREATING BLACK-AND-WHITE PHOTO THAT IMITATES EXPERT RETOUCHING STYLES

(71) Applicants: GIST(Gwangju Institute of Science and Technology), Gwangju (KR); Inha University Research and Business Foundation, Incheon (KR)

(72) Inventors: Hae Gon Jeon, Gwangju (KR); Seung Hyun Shin, Gwangju (KR); Ji Su Shin, Gwangju (KR); Ji Hwan Bae, Seoul (KR); Inwook Shim, Incheon (KR)

(73) Assignees: GIST(Gwangju Institute of Science and Technology), Gwangju (KR); Inha University Research and Business Foundation, Incheon (KR)

( * ) Notice: Subject to any disclaimer, the term of this patent is extended or adjusted under 35 U.S.C. 154(b) by 235 days.

(21) Appl. No.: 18/508,456

(22) Filed: Nov. 14, 2023

(65) Prior Publication Data

US 2024/0303790 A1 Sep. 12, 2024

(30) Foreign Application Priority Data

Mar. 8, 2023 (KR) ........................ 10-2023-0030667

(51) Int. Cl.
| | |
|---|---|
| *G06T 5/77* | (2024.01) |
| *G06V 10/764* | (2022.01) |
| *G06V 10/77* | (2022.01) |
| *G06V 10/774* | (2022.01) |
| *G06V 10/82* | (2022.01) |

(52) U.S. Cl.
CPC .............. *G06T 5/77* (2024.01); *G06V 10/764* (2022.01); *G06V 10/7715* (2022.01); *G06V 10/774* (2022.01); *G06V 10/82* (2022.01); *G06T 2207/10024* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2022/0222872 A1* 7/2022 Ghosh .................... G06N 3/047

OTHER PUBLICATIONS

Cai, Bolun, Xiangmin Xu, and Xiaofen Xing. "Perception preserving decolorization." 2018 25th IEEE International conference on image processing (ICIP). IEEE, 2018. (Year: 2018).*
Shin, Seunghyun, et al. "Close imitation of expert retouching for black-and-white photography." Proceedings of the IEEE/CVF Conference on Computer Vision and Pattern Recognition. 2024. (Year: 2024).*

(Continued)

*Primary Examiner* — Sean M Conner
(74) *Attorney, Agent, or Firm* — Studebaker Brackett PLLC

(57) ABSTRACT

The present invention relates to a method for creating a neural network model which can imitate retouching styles of a plurality of experts, and creating a black-and-white photo which gives aesthetics by inputting a color photo into the neural network model.

12 Claims, 9 Drawing Sheets
(1 of 9 Drawing Sheet(s) Filed in Color)

(56) References Cited

OTHER PUBLICATIONS

Song, Yuda, Hui Qian, and Xin Du. "Starenhancer: Learning real-time and style-aware image enhancement." Proceedings of the IEEE/CVF International Conference on Computer Vision. 2021. (Year: 2021).*

Yang, Zhibo, et al. "Hierarchical proxy-based loss for deep metric learning." Proceedings of the IEEE/CVF winter conference on applications of computer vision. 2022. (Year: 2022).*

Liu, Qiegen, and Henry Leung. "Variable augmented neural network for decolorization and multi-exposure fusion." Information Fusion 46 (2019): 114-127. (Year: 2019).*

* cited by examiner

FIG. 7

METHOD FOR CREATING BLACK-AND-WHITE PHOTO THAT IMITATES EXPERT RETOUCHING STYLES

CROSS-REFERENCE TO RELATED APPLICATIONS

This application claims the priority of Korean Patent Application No. 10-2023-0030667 filed on Mar. 8, 2023, in the Korean Intellectual Property Office, the disclosure of which is incorporated herein by reference.

BACKGROUND OF THE INVENTION

Field of the Invention

The present invention relates to a method for creating a neural network model which can imitate retouching styles of a plurality of experts, and creating a black-and-white photo which gives aesthetics through the created neural network model.

Description of the Related Art

Black-and-white photos have a dynamic range and clarity higher than color photos to provide a richer texture and contrast. Through this, the black and white photos provide unique aesthetic and emotions that are not seen in the color photos.

The aesthetics of the black-and-white photo can be achieved only through the careful corrections of high-end cameras or experts for black-and-white shooting, not just an additional function of smartphones or DSLR cameras.

Currently, various neural network networks for converting the black-and-white photos are proposed in a computer vision field, but they all focus on minimizing the loss of texture in converting RGB gradation values to a grayscale, and adding aesthetic elements to the creation of the black-and-white photo is not studied.

SUMMARY OF THE INVENTION

The present invention has been made in an effort to imitate retouching styles of experts through a neural network model to convert a color photo into a black-and-white photo.

The objects of the present invention are not limited to the above-mentioned objects, and other objects and advantages of the present invention that are not mentioned can be understood by the following description, and will be more clearly understood by embodiments of the present invention. Further, it will be readily appreciated that the objects and advantages of the present invention can be realized by means and combinations shown in the claims.

In order to achieve the object, an exemplary embodiment of the present invention provides a method for creating a black-and-white photo, which includes: creating a first embedding vector according to a style and a shooting object by inputting a plurality of first training black-and-white photos into a first neural network, and extracting a plurality of proxy vectors representing each cluster formed by the first embedding vector to train the first neural network; creating a second embedding vector by converting a training color photo into a second training black-and-white photo and inputting the second training black-and-white photo into the first neural network; identifying a training proxy vector corresponding to a random style and a shooting object for the training color photo among a plurality of proxy vectors;

converting a distribution of a second embedding vector into a distribution of the training proxy vector by inputting the training color photo, the training proxy vector, and the second embedding vector into the second neural network, and creating a decolored image by applying a pixel-wise weight corresponding to the converted distribution to the training color photo to train the second neural network; and converting a target color photo into a black-and-white photo corresponding to a target style by using the first and second neural networks for which training is completed.

In an exemplary embodiment, the first neural network includes a style classification neural network classifying the style of the first training black-and-white photo, an object classification neural network classifying the shooting object in the first training black-and-white photo, and a multi-layer perceptron (MLP) creating the first embedding vector by combining outputs of the style classification neural network and the object classification neural network.

In an exemplary embodiment, the training of the first neural network includes training the first neural network so that the first embedding vector v is positioned to be close for the same style and to be far for a different shooting object in an embedding space.

In an exemplary embodiment, the creating of the second embedding vector includes creating the second training black-and-white photo by converting a gradation value of the training color photo into a grayscale, and inputting the second training black-and-white photo into each of the style classification neural network and the object classification neural network, and determining an output of the multi-layer perceptron as the second embedding vector.

In an exemplary embodiment, the identifying of the training proxy vector includes identifying any one training proxy vector corresponding to a random style arbitrarily set for the training color photo and a shooting object in the training color photo among the plurality of proxy vectors.

In an exemplary embodiment, the shooting object in the training color photo is identified by inputting the second training black-and-white photo into the object classification neural network in the first neural network.

In an exemplary embodiment, the second neural network includes an encoder extracting a feature from the training color photo, and converting the distribution of the second embedding vector into the distribution of the training proxy vector, and a decoder outputting the pixel-wise weight from the feature extracted from the encoder and the converted distribution of the second embedding vector.

In an exemplary embodiment, the second neural network further includes a fully connected layer (FCL) that extracts feature maps from the second embedding vector and the training proxy vector, respectively, and the encoder converts a distribution of the feature map for the second embedding vector into a distribution of the feature map for the training proxy vector.

In an exemplary embodiment, the encoder converts the distribution of the feature map of the second embedding vector into the distribution of the feature map of the training proxy vector according to [Equation 1] below.

$$\mathcal{F}' = \sigma_t\left(\frac{\mathcal{F} - \mu_s}{\sigma_s}\right) + \mu_t \qquad \text{[Equation 1]}$$

($\mathcal{F}'$ represents the feature map for the second embedding vector v, $\mathcal{F}$ represents the feature map for the second embedding vector v, $\mu_s, \mu_t$ represent a mean and a distribution of the feature map for the second embedding vector v, respectively, and $\mu_t, \sigma_t$ represent a mean and a distribution of the feature map for the training proxy vector p, respectively.)

In an exemplary embodiment, the pixel-wise weight is a bilateral grid type weight for a pixel-wise gradation value of the training color photo.

In an exemplary embodiment, the training of the second neural network includes training the second neural network so that a difference between the decolorized image created by multiplying the pixel-wise gradation value of the training color photo by the pixel-wise weight, and a ground truth (GT) black-and-white photo into which the training color photo is converted according to the random style becomes minimal.

In an exemplary embodiment, the converting into the black-and-white photo includes converting the target color photo into a grayscale image, and inputting the grayscale image into the first neural network, and inputting a proxy vector corresponding to the target style into the second neural network, and converting the target color photo into a black-and-white photo.

According to the present invention, a neural network model is trained to imitate black-and-white conversion styles of experts to achieve aesthetic enhancement in a black-and-white photo creation operation using a deep learning model.

In addition to the above-described effects, the specific effects of the present invention are described together while describing specific matters for implementing the invention below.

BRIEF DESCRIPTION OF THE DRAWINGS

The patent or application file contains at least one drawing executed in color. Copies of this patent or patent application publication with color drawing (s) will be provided by the Office upon request and payment of the necessary fee.

FIG. 7 is a diagram illustrating an entire architecture in which the first and second neural networks are combined.

DETAILED DESCRIPTION OF THE PREFERRED EMBODIMENT

Figure 1:
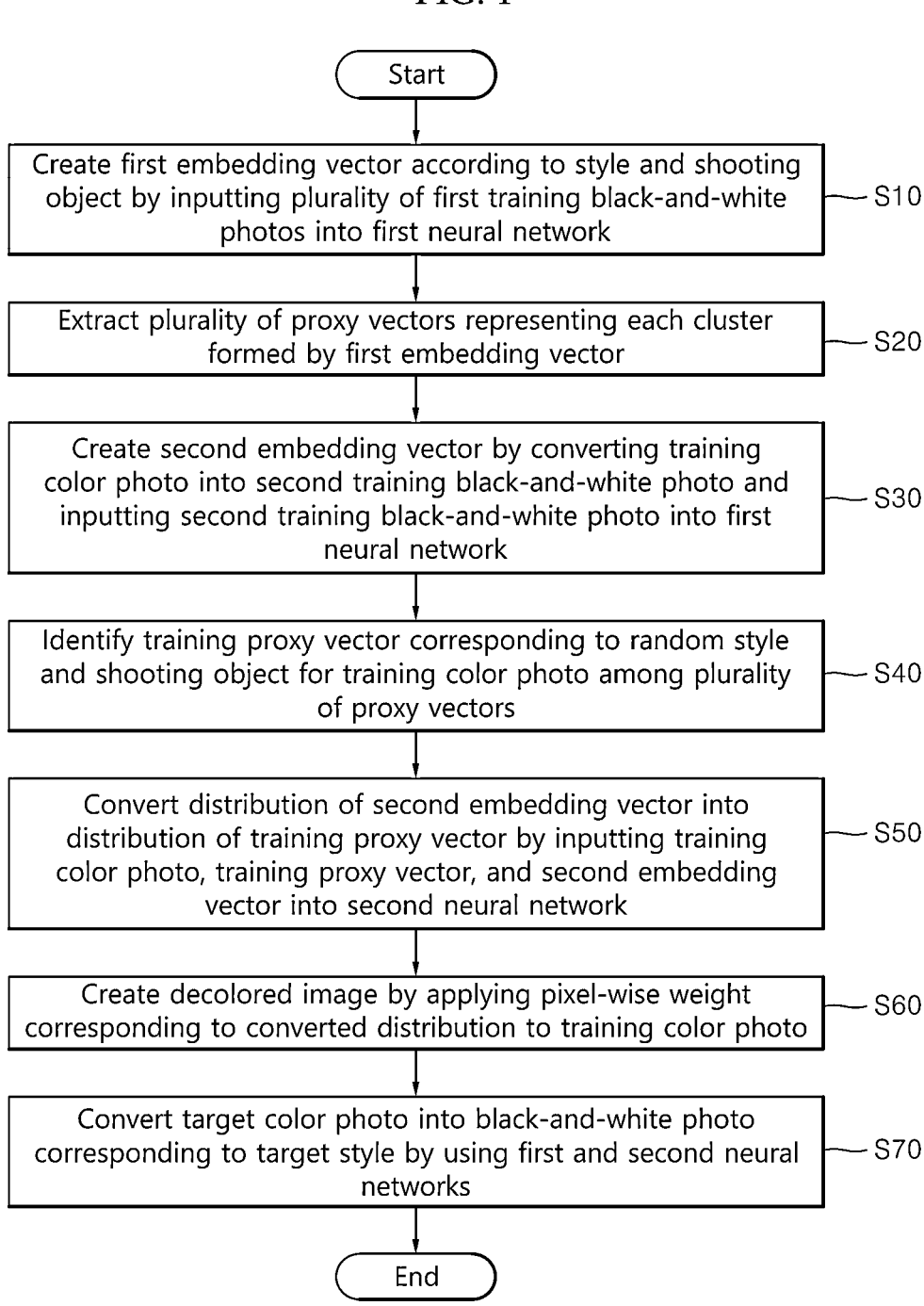
FIG. 1 is a flowchart illustrating a method for creating a black-and-white photo according to an exemplary embodiment of the present invention.

The above-mentioned objects, features, and advantages will be described in detail with reference to the drawings, and as a result, those skilled in the art to which the present invention pertains may easily practice a technical idea of the present invention. In describing the present invention, a detailed description of related known technologies will be omitted if it is determined that they unnecessarily make the gist of the present invention unclear. Hereinafter, a preferable embodiment of the present invention will be described in detail with reference to the accompanying drawings. In the drawings, the same reference numeral is used for representing the same or similar components.

Although the terms "first", "second", and the like are used for describing various components in this specification, these components are not confined by these terms. The terms are used for distinguishing only one component from another component, and unless there is a particularly opposite statement, a first component may be a second component, of course.

Further, in this specification, any component is placed on the "top (or bottom)" of the component or the "top (or bottom)" of the component may mean that not only that any configuration is placed in contact with the top surface (or bottom) of the component, but also that another component may be interposed between the component and any component disposed on (or under) the component.

In addition, when it is disclosed that any component is "connected", "coupled", or "linked" to other components in this specification, it should be understood that the components may be directly connected or linked to each other, but another component may be "interposed" between the respective components, or the respective components may be "connected", "coupled", or "linked" through another component.

Further, a singular form used in the present invention may include a plural form if there is no clearly opposite meaning in the context. In the present invention, a term such as "comprising" or "including" should not be interpreted as necessarily including all various components or various steps disclosed in the present invention, and it should be interpreted that some component or some steps among them may not be included or additional components or steps may be further included.

In addition, in this specification, when the component is called "A and/or B", the component means, A, B or A and B unless there is a particular opposite statement, and when the component is called "C or D", this means that the term is C or more and D or less unless there is a particular opposite statement.

The present invention relates to a method for creating a neural network model which can imitate retouching styles of a plurality of experts, and creating a black-and-white photo which gives aesthetics through the created neural network model. Hereinafter, a method for creating a black-and-white photo according to an exemplary embodiment of the present invention will be described with reference to FIGS. 1 to 8.

FIG. 1 is a flowchart illustrating a method for creating a black-and-white photo according to an exemplary embodiment of the present invention.

Figure 2A:
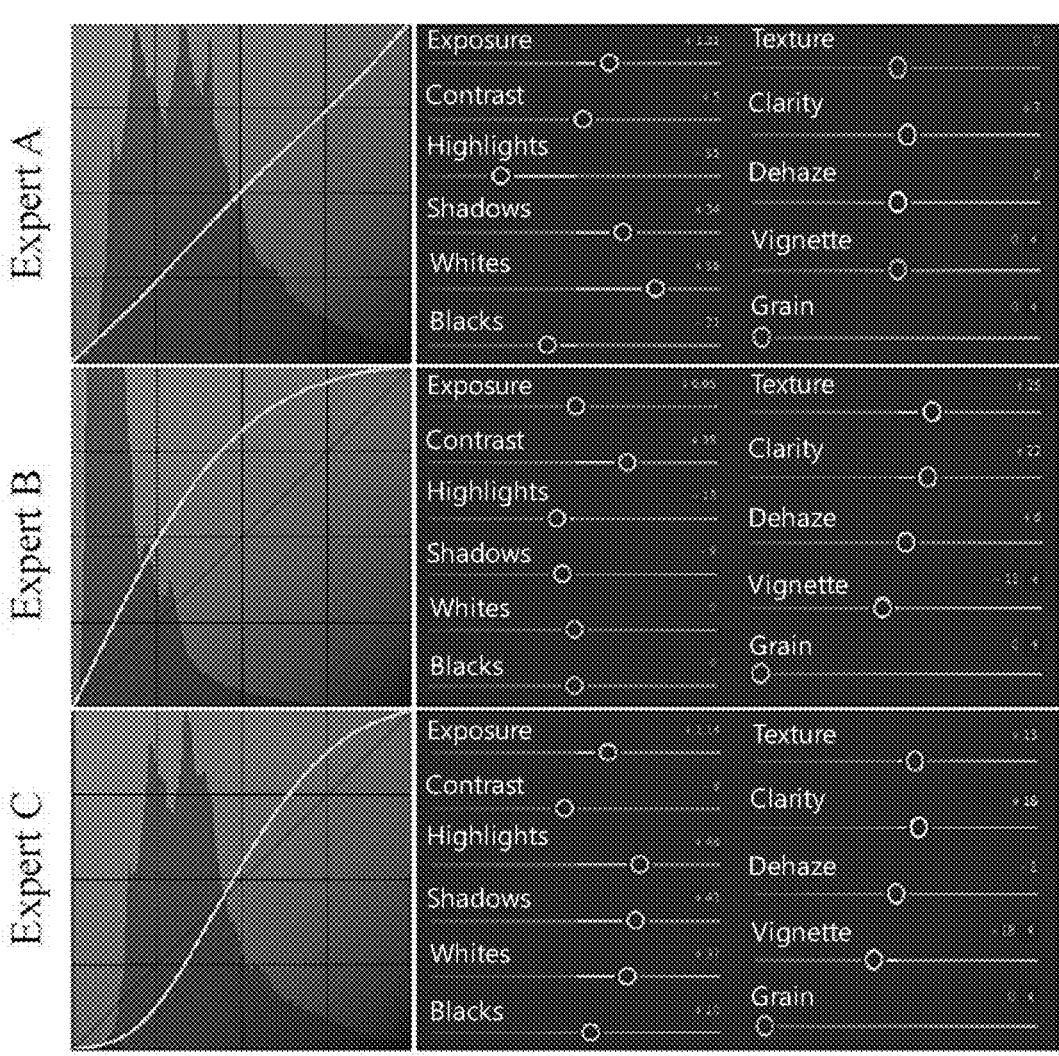
FIG. 2A is a diagram exemplarily illustrating parameters controlled by each expert.
Figure 2B:
FIG. 2B is a diagram exemplarily illustrating black-and-white photos retouched according to the parameter illustrated in FIG. 2A.

FIG. 2A is a diagram exemplarily illustrating parameters controlled by each expert, and FIG. 2B is a diagram exemplarily illustrating black-and-white photos retouched according to the parameter illustrated in FIG. 2A.

Figure 3:
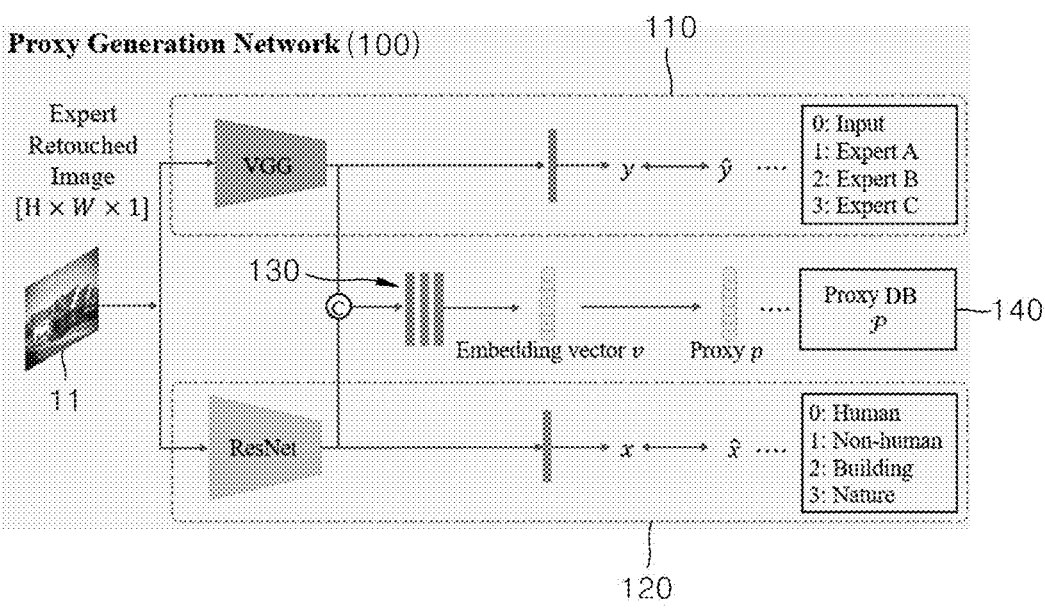
FIG. 3 is a diagram exemplarily illustrating a first neural network which creates an embedding vector for the black-and-white photo.
Figure 4:
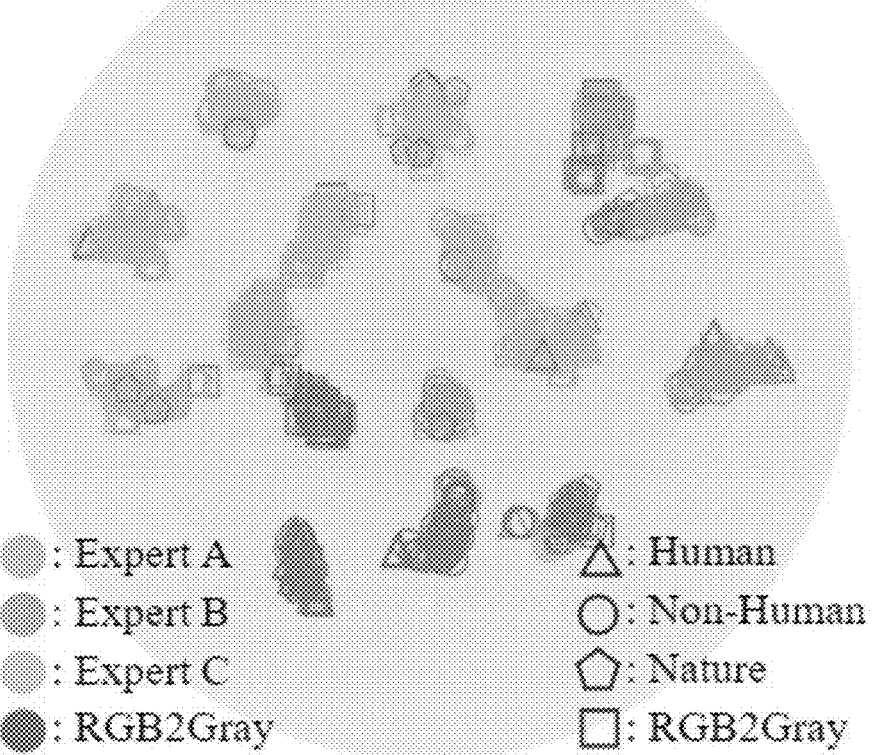
FIG. 4 is a diagram illustrating a case where a retouching style and an object-wise embedding vector are clustered in an embedding space.

FIG. 3 is a diagram exemplarily illustrating a first neural network which creates an embedding vector for the black-and-white photo. FIG. 4 is a diagram illustrating a case where a retouching style and an object-wise embedding vector are clustered in an embedding space.

Figure 5:
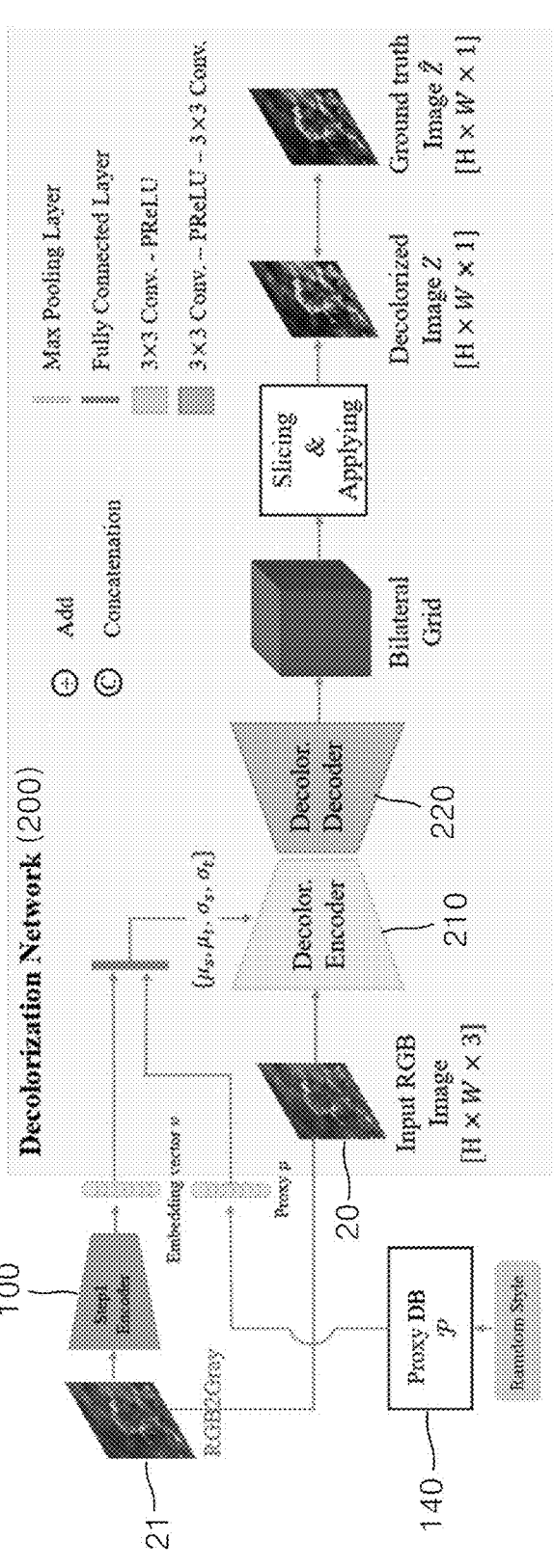
FIG. 5 is a diagram exemplarily illustrating a second neural network which creates a black-and-white photo converted according to a desired style.

FIG. 5 is a diagram exemplarily illustrating a second neural network which creates a black-and-white photo converted according to a desired style.

Figure 6:
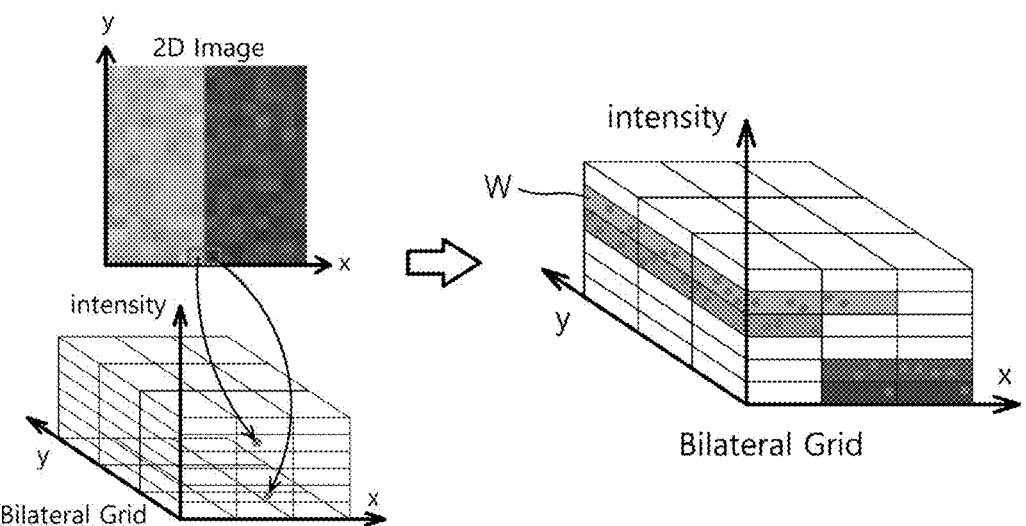
FIG. 6 is a diagram illustrating a bilateral grid type weight applied to a color photo.

FIG. 6 is a diagram illustrating a bilateral grid type weight applied to a color photo.

Figure 7:
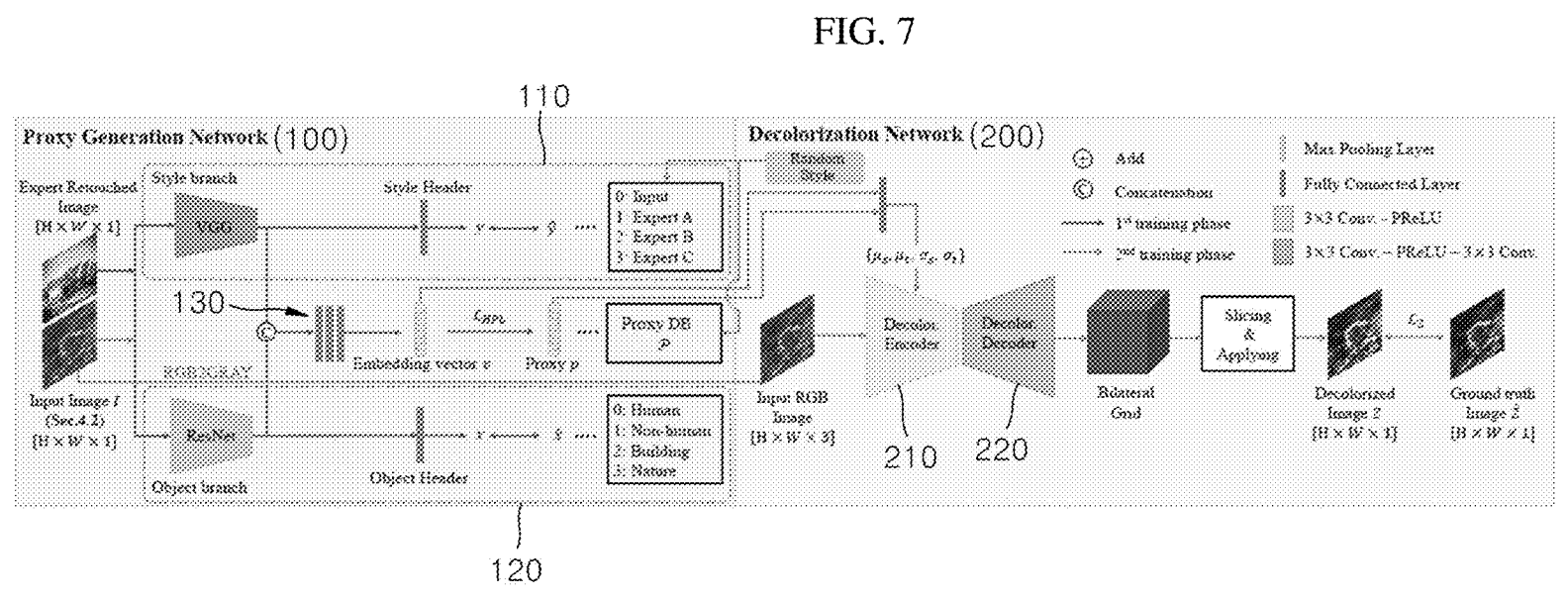
Figure 8:
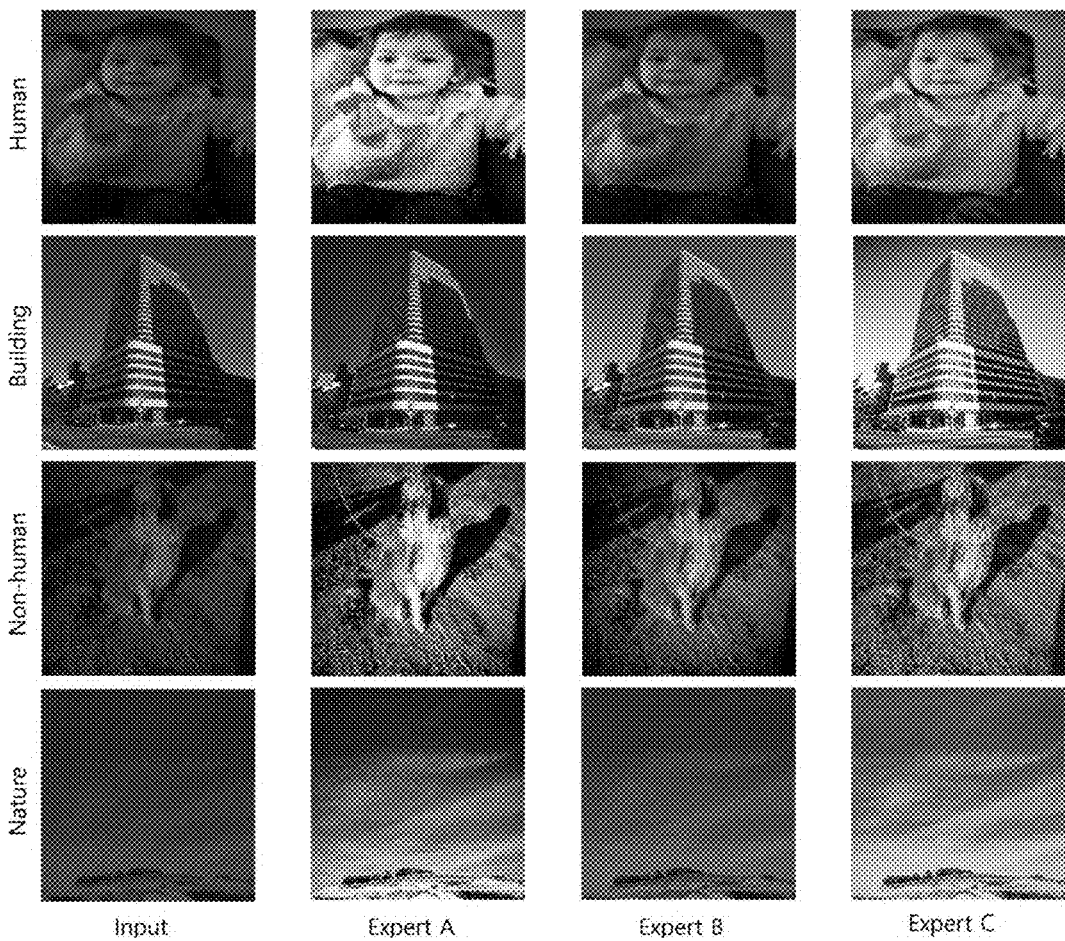
FIG. 8 is a diagram exemplarily illustrating black-and-white photos created according to the present invention.

FIG. 7 is a diagram illustrating an entire architecture in which the first and second neural networks are combined and FIG. 8 is a diagram exemplarily illustrating black-and-white photos created according to the present invention.

Referring to FIG. 1, the method (hereinafter, referred to as a black-and-white creating method) for creating a black-and-white photo that imitates retouching styles of experts according to an exemplary embodiment of the present invention may include a step of training a first neural network through a step S10 of creating a first embedding vector according to a style and a shooting object by inputting a plurality of first training black-and-white photos into a first neural network, and a step S20 of extracting a plurality of proxy vectors representing each cluster formed by the first embedding vector.

Subsequently, the black-and-white creating method may include a step of training the second neural network through a step S30 of creating a second embedding vector by converting a training color photo into a second training black-and-white photo and inputting the second training black-and-white photo into the first neural network, a step S40 of identifying a training proxy vector corresponding to a random style and a shooting object for the training color photo among a plurality of proxy vectors, a step S50 of converting a distribution of a second embedding vector into a distribution of the training proxy vector by inputting the training color photo, the training proxy vector, and the second embedding vector into the second neural network, and a step S60 of creating a decolored image by applying a pixel-wise weight corresponding to the converted distribution to the training color photo.

Subsequently, the black-and-white creating method may include a step S70 of converting a target color photo into a black-and-white photo corresponding to a target style by using the first and second neural networks trained as above.

However, the black-and-white creating method illustrated in FIG. 1 follows an exemplary embodiment, and respective steps constituting the present invention are not limited to the exemplary embodiment illustrated in FIG. 1 and if necessary, some steps may be added, modified, or deleted.

The respective steps illustrated in FIG. 1 may be performed by a processor implemented as a central processing unit (CPU), a graphics processing unit (GPU), etc., and the processor may further include at least one physical element among application specific integrated circuits (ASICS), digital signal processors (DSPs), digital signal processing devices (DSPDs), programmable logic devices (PLDs), field programmable gate arrays (FPGAs), a controller, and micro-controllers.

In the present invention, a neural network model used for creating the black-and-white photo includes first and second neural networks 100 and 200, and first, a process of training the first neural network 100, i.e., steps S10 and S20 will be described in detail.

The processor inputs a first training black-and-white photo 11 into the first neural network 100 to create a first embedding vector v according to the style and shooting object for each first training black-and-white photo 11.

The first training black-and-white photo 11 as a black-and-white photo used for training the first neural network 100 may be retouched by a manual work of the expert. As a result, the first training black-and-white photo 11 may have a style according to each expert.

Referring to FIGS. 2A and 2B jointly, a detailed retouching method may be different for each expert in converting the same color photo into the black-and-white photo.

Specifically, retouching schemes of experts A, B, and C may be similar in terms of controlling global parameters including a gamma curve, exposure, contrast, etc., and then applying a filter such as vignetting, gamma correction, etc., for each part in the photo.

However, expert A is different from other experts in that expert A controls an exposure value to be high, and controls a dark area to be comparatively bright by using a clarity and a shadow effect, expert B is different from other experts in that expert B increases a detail of a scene through controlling a texture and the clarity, and emphasizing a main subject such as a person or flower through the vignetting filter, and expert C is different from other experts in that expert C corrects a brightest part and a darkest part in an image through controlling a highlight and a shadow level to allow the black-and-white photo to obtain a higher dynamic range.

Further, a detailed retouching method may be different depending on a shoot object (hereinafter, referred to as a shooting object) in spite of retouching by the same expert.

Specifically, expert A tends to apply an edge enhancement filter and a high exposure value while increasing a contrast of a building when retouching a building photo. Unlike this, when retouching a portrait photo, expert A tends to enrich a detail of a minute structure such as hair by using a strong shadow effect.

Similarly, experts B and C also apply different retouching methods according to the shooting object, and in the present invention, a black-and-white photo for each of shooting objects (human, non-human, building, and nature) retouched by the respective experts may be collected, and used as the first training black-and-white photo 11.

The processor inputs each first training black-and-white photo 11 into the first neural network 100 to create the first embedding vector v (S10). As described above, the first training black-and-white photo 11 may have a tendency according to a style, i.e., who an expert retouching the photo is. Further, the first training black-and-white photo 11 may have the tendency according to the shooting object of the photo.

The first embedding vector v may be created based on a feature of the first training black-and-white photo 11, and as a result, the first embedding vector v may have a similarity according to the same style and the same shooting object. Hereinafter, a method for creating the first embedding vector v will be described with reference to an exemplary structure of the first neural network 100.

Referring to FIG. 3, the first neural network 100 may include a style classification neural network 110 classifying the style of the first training black-and-white photo 11, an object classification neural network 120 classifying the shooting object in the first training black-and-white photo 11, and a multi-layer perceptron (MLP) 130 creating the first embedding vector v by combining outputs of two neural networks described above.

The style classification neural network 110 and the object classification neural network 120 may be convolution based neural networks performing a classification task by receiving images as an input.

The style classification neural network 110 sets the first training black-and-white photo 11 as input data for the classification task, and may be supervised learned by a training dataset having a class (0 to 3) determined according to a style of the image, i.e., who the expert is as output data. Further, the object classification neural network 120 may be supervised learned by a training dataset having the first training black-and-white photo 11 as the input data and a class (0 to 3) determined according to the shooting object in the photo as the output data. Here, each class may be pre-labeled for each first training black-and-white photo 11.

By the supervised learning, the style classification neural network 110 may extract a feature corresponding to the style in the first training black-and-white photo 11, and the object classification neural network 120 may extract a feature corresponding to the shooting object from the first training black-and-white photo 11. In an example of the present invention, the style classification neural network 110 may be implemented as VGG, and the object classification neural network 120 may be implemented as ResNet.

The respective features from the style classification neural network 110 and the object classification neural network 120 may be combined and input into the multi-layer perceptron 130. The multi-layer perceptron 130 may be constituted by an input layer, a hidden layer, and an output layer, and may create the first embedding vector v from the above combined feature.

In this case, the multi-layer perceptron 130 may be unsupervised learned so that the first embedding vector v is positioned to be close for the same style and to be far for a different shooting object in an embedding space.

Referring to FIG. 4, first embedding vectors v created from a plurality of first training black-and-white photos 11 may have a relative distance in the embedding space. As described above, since the first embedding vector v has the tendency according to the style and the shooting object, first embedding vectors v created from first training black-and-white photos 11 having the same style and the same shooting object may constitute a cluster.

The present invention as a technology that basically creates different black-and-white photos according to the style, and additionally considers a difference for each object, and to this end, the processor may set a hierarchical loss function which prioritizes the style so that the first embedding vector v is positioned to be close for the same style and to be far for a different shooting object even for the same style.

The multi-layer perceptron 130 may be unsupervised learned so that the loss function is minimal, and as a result, as illustrated in FIG. 4, the first embedding vectors v may be positioned to be close for the same style and the first embedding vectors v may be positioned to be far for a different shooting object.

The processor may extract a plurality of proxy vectors p representing each cluster formed by the first embedding vector v (S20).

As described above, the first embedding vectors v may form the cluster according to the style and the shooting object. In the example of FIG. 4, since the first embedding vector v is created with respect to four styles (RGB2Gray, and experts A, B, and C) and four shooting objects (human, non-human, building, and nature), a total of 16 clusters may be formed.

The processor may extract the proxy vector p representing each cluster from the above created first embedding vectors v, and store the extracted proxy vector p in a proxy DB 140. As a result, a total of 16 proxy vectors p may be stored in the proxy DB 140.

In this case, the proxy vector p is a vector of the same dimension as the first embedding vector v, and the first embedding vectors v in each cluster may be positioned in the vicinity of the proxy vector p in the embedding space. The proxy vector p may also be determined as a mean or a median of the first embedding vector v in each cluster, and besides, also be determined by various methods which may determine a representative value.

Meanwhile, the hierarchical loss function setting operation of the processor may be performed for the proxy vector p. In other words, the processor may also set the hierarchical loss function so that the proxy vector p is positioned to be close for the same style and to be far for a different shooting object even for the same style.

The first neural network 100 may be trained through steps S10 and S20 described above. When summarized by referring back to FIG. 3, when the first training black-and-white photo 11 is input into the first neural network 100, the style classification neural network 110 and the object classification neural network 120 may be supervised learned to output the pre-labeled class (style and shooting object) for the first training black-and-white photo 11, and the multi-layer perceptron 130 may be unsupervised learned so that the hierarchical loss function is minimal.

Next, a process of training the second neural network 200, i.e., steps S30 to S60 will be described in detail.

When the training of the first neural network 100 is completed, the processor converts the training color photo 20 into the second training black-and-white photo 21, and inputs the second training black-and-white photo 21 into the first neural network 100 to create the second embedding vector v (S30). Here, the training color photo 20 may be an original photo to be retouched by the experts.

Referring to FIG. 5, the processor may convert the training color photo 20 into the second training black-and-white photo 21, and in this case, as a conversion scheme, a scheme that never considers the style of the expert or the shooting object may be used. For example, the processor may just convert a gradation value of the training color photo 20 into a grayscale, and to this end, use an RGB2Gray function.

Subsequently, the processor may input the second training black-and-white photo 21 into the first neural network 100. The first neural network 100 is trained to create the embedding vector v from the black-and-white photo through steps S10 and S20, so the processor may create the second embedding vector v for the second training black-and-white photo 21 through the first neural network 100.

Specifically, referring back to FIG. 3, the processor may input the second training black-and-white photo 21 into each of the style classification neural network 110 and the object classification neural network 120, and determine outputs of the multi-layer perceptron 130 connected to output terminals of both classification neural networks 110 and 120 as the second embedding vector v.

Meanwhile, the processor may identify the training proxy vector p corresponding to a random style for the training color photo 20 and a shooting object of the training color photo 20 among a plurality of proxy vectors p (S40).

Here, the random style as a style to be applied to the training color photo 20 may be the style of any one of experts A, B, and C exemplified as above, and may be arbitrarily set by the processor in a training process. Further, the training proxy vector p may mean a proxy vector p used for training the second neural network 200 among the proxy vectors p extracted in the training process of the first neural network 100.

The processor may identify any one training proxy vector p corresponding to the random style and the shooting object in the training color photo 20 among the plurality of proxy vectors p stored in the proxy DB 140. In this case, the shooting object may identify, the first neural network 100, specifically, the object classification neural network 120.

For example, referring to FIGS. 3 to 5 jointly, when the random style is the style (class 1) of expert A and the shooting object identified through the object classification neural network 120 is non-human (class 1), the processor may identify any one training proxy vector p corresponding to the style of class 1 and the shooting object of class 1 among 16 proxy vectors p stored in the proxy DB 140.

Subsequently, the processor inputs the training color photo 20, the training proxy vector p, and the second embedding vector v into the second neural network 200 to convert the distribution of the second embedding vector v into the distribution of the training proxy vector p (S50).

Since the second training black-and-white photo 21 is created through just converting the grayscale in which the style or shooting object is not considered as described above, the second embedding vector v created based on the second training black-and-white photo 21 may have the tendency according to the style or shooting object. Unlike this, the training proxy vector p may have a high tendency for the random style, i.e., the style and the shooting object to be applied to the training color photo 20.

In order to imitate the retouching scheme of the expert according to the style and the shooting object, the processor may convert a distribution of the second embedding vector v having no tendency into the distribution of the training proxy vector p by using the second neural network 200.

Referring back to FIG. 5, the second neural network 200 may include an encoder 210 that extracts the feature from the training color photo 20, and converts the distribution of the second embedding vector v into the distribution of the training proxy vector p.

The encoder 210 may define the distribution by calculating each of an average vector and a distribution vector of the second embedding vector v and the training proxy vector p, and convert the distribution of the second embedding vector v into the distribution of the training proxy vector p.

Meanwhile, the second embedding vector v and the training proxy vector p may have a data structure which is difficult to define the distribution, and in this case, the second neural network 200 may further include a fully connected layer (FCL) that extracts feature maps of which distributions can be defined from the second embedding vector v and the training proxy vector p, respectively.

In this case, the encoder 210 may convert the distribution of the feature map for the second embedding vector v into the distribution of the feature map of the training proxy vector p. Specifically, the encoder 210 may convert the distribution according to [Equation 1] below.

$$\mathcal{F}' = \sigma_t \left( \frac{\mathcal{F} - \mu_s}{\sigma_s} \right) + \mu_t \qquad \text{[Equation 1]}$$

($\mathcal{F}'$ represents the feature map for the second embedding vector v, $\mathcal{F}$ represents the feature map for the second embedding vector v, $\mu_s, \mu_t$ represent a mean and a distribution of the feature map for the second embedding vector v, respectively, and $\mu_t, \sigma_t$ represent a mean and a distribution of the feature map for the training proxy vector p, respectively.)

Subsequently, the processor may create a disclosed image by applying a pixel-wise weight corresponding to the converted distribution of the second embedding vector v to the training color photo 20 (S60).

The processor may create the pixel-wise weight from the feature extracted from the training color photo 20 and the converted distribution of the second embedding vector v. To this end, the processor may use a decoder 220.

Referring back to FIG. 5, the second neural network 200 may include the decoder 220 that receives the feature extracted from the encoder 210 and the converted distribution of the second embedding vector v, and outputs the pixel-wise weight based thereon.

The pixel-wise weight output from the decoder 220 may be a set of weights applied to gradation values of respective pixels in the training color photo 20 in order to decolor the training color photo 20. The weight may also be determined differently for each pixel. However, in this case, since overfitting for the color photo used for the training may occur, the weight may also be determined equally for pixels having a similar gradation value.

In an example, the pixel-wise weight may include a bilateral grid type weight for the pixel-wise gradation value of the training color photo 20.

Referring to FIG. 6, a bilateral grid may be a 3-dimensional (D) grid defined by an intensity of a gradation value corresponding to coordinates (x-axis and y-axis coordinates) of the image training color photo 20. In this case, one grid may be mapped to one weight, and pixels having a similar gradation value may be included in the same grid. As a result, the same weight may be set with respect to the pixels having the similar gradation value.

As such, the bilateral grid type weight is used, so the present invention may prevent different weights from being applied to neighboring pixels having the same gradation value, and through this, overfitting for the training color photo 20 may be suppressed and consistency may be guaranteed in a decoloration process.

Referring back to FIG. 5, the processor may create a decolorized image by multiplying the pixel-wise gradation value of the training color photo 20 by the pixel-wise weight determined according to the above-described method. In this case, the second neural network 20 may be trained so that a difference between the created decolored image and a ground truth (GT) black-and-white photo into which the training color photo 20 is converted according to the random style becomes minimal.

Here, the ground truth image may be a black-and-white photo which the expert directly retouches according to the random style. As exemplified above, the random style may be the style of any one of experts A, B, and C, and the respective training color photos 20 may be pre-retouched by experts A, B, and C. In this case, the black-and-white photo retouched by each expert may be the ground truth image.

For the above-described training, the processor may set the sum of difference values between decolorized images for all training color photos 20 and the ground truth image as the loss function, and the second neural network 200, specifically, the encoder 210 and the decoder 220 may be trained so that the loss function becomes minimal.

The second neural network 200 may be trained through steps S30 and S60 described above. Meanwhile, since the embedding vector v and the proxy vector p determined by the first neural network 100 are used for training the second neural network 200, the training process of the second neural network 200 may be performed after the training of the first neural network 100 is completed.

When summarized by referring to the entire neural network model illustrated in FIG. 7, first, the processor may create the first embedding vector v by inputting the first training black-and-white photo 11 into the first neural network 100, and train the first neural network 100 through a process of extracting the proxy vector p representing the clustered first embedding vector v.

In this case, (the style classification neural network 110 and the object classification neural network 120 in the first neural network 100 may be trained by the first training black-and-white photo 11, and the style and the shooting object corresponding thereto, and the multi-layer perceptron 130 in the first neural network 100 may be trained according to a hierarchical loss function $L_{HPL}$ set so that the proxy vector p is positioned to be close for the same style and to be far for a different shooting object even for the same style.

When the training of the first neural network is completed, the processor freezes all parameters (weight and bias) of the first neural network 100, and converts the training color photo 20 into the second training black-and-white photo 21, and inputs the second training black-and-white photo 21 to create the second embedding vector v.

Subsequently, the processor may train the second neural network 200 through a process of identifying the training proxy vector p corresponding to the random style and the shooting object set with respect to the training color photo 20, and creating the decolorized image by inputting the training proxy vector p and the second embedding vector v into the second neural network 200.

In this case, the encoder 210 and the decoder 220 in the second neural network 200 may be trained according to a loss function $L_2$ which is in proportion to a difference between the decolored image and the training color photo 20 retouched according to the random style, i.e., the ground truth image.

When the training of both the first and second neural networks 100 and 200 is completed, the processor may convert a target color photo into a black-and-white photo corresponding to a target style (S70).

Here, the target color photo as a photo which is not used for training may be a photo provided for conversion into the black-and-white photo by a user. Meanwhile, the target style as a style which the user intends to apply to the target color photo may correspond to the style of any one of experts A, B, and C exemplified as above.

When a black-and-white creation operation is described with reference to FIG. 7, the processor may convert the target color photo into a grayscale image (RGB2Gray), and input the grayscale image into the first neural network 100. As a result, the first neural network 100 may create an embedding vector v for the grayscale image.

Subsequently, the processor may identify the proxy vector p corresponding to the target style (input instead of the random style of FIG. 7) from the proxy DB 140. Specifically, the processor may identify the shooting object in the grayscale image through the object classification neural network 120 in the first neural network 100, and identify any one proxy vector p corresponding to the target style and the shooting object among the plurality of proxy vectors p stored in the proxy DB 140.

The processor may input the target color photo and any one proxy vector p identified as above into the second neural network 200. As a result, the second neural network 200 converts the distribution of the embedding vector v created in the first neural network 100 into the distribution of the proxy vector p, and applies the pixel-wise weight corresponding to the converted distribution to the target color photo to create the black-and-white photo corresponding to the target style.

Referring to FIG. 8, it may be confirmed that the neural network model may create the black-and-white photo for each of different styles for the same color photo (input) according to the operation of the present invention, and the retouching scheme of the neural network model varies depending on the object (the human, the non-human, the building, and the nature) included in the color photo.

As described above, according to the present invention, the neural network model is trained to imitate black-and-white conversion styles of experts to achieve aesthetic enhancement in a black-and-white photo creation operation using a deep learning model.

Although the present invention has been described above by the drawings, but the present invention is not limited by the exemplary embodiments and drawings disclosed in the present invention, and various modifications can be made from the above description by those skilled in the art within the technical ideas of the present invention. Moreover, even though an action effect according to a configuration of the present invention is explicitly disclosed and described while describing the exemplary embodiments of the present invention described above, it is natural that an effect predictable by the corresponding configuration should also be conceded.

What is claimed is:

1. A method for creating a black-and-white photo, the method comprising:

creating a first embedding vector according to a style and a shooting object by inputting a plurality of first training black-and-white photos into a first neural network, and extracting a plurality of proxy vectors representing each cluster formed by the first embedding vector to train the first neural network;

creating a second embedding vector by converting a training color photo into a second training black-and-white photo and inputting the second training black-and-white photo into the first neural network;

identifying a training proxy vector corresponding to a random style and the shooting object for the training color photo among the plurality of proxy vectors;

converting a distribution of the second embedding vector into a distribution of the training proxy vector by inputting the training color photo, the training proxy vector, and the second embedding vector into a second neural network, and creating a decolored image by applying a pixel-wise weight corresponding to the converted distribution to the training color photo to train the second neural network; and converting a target color photo into a black-and-white photo corresponding to a target style by using the first and second neural networks for which training is completed.

2. The method of claim 1, wherein the first neural network includes a style classification neural network classifying the style of the first training black-and-white photo, an object classification neural network classifying the shooting object in the first training black-and-white photo, and a multi-layer perceptron (MLP) creating the first embedding vector by combining outputs of the style classification neural network and the object classification neural network.

3. The method of claim 1, wherein the training of the first neural network includes training the first neural network so that the first embedding vector is positioned to be close for the same style and to be far for a different shooting object in an embedding space.

4. The method of claim 2, wherein the creating of the second embedding vector includes creating the second training black-and-white photo by converting a gradation value of the training color photo into a grayscale, and inputting the second training black-and-white photo into each of the style classification neural network and the object classification neural network, and determining an output of the multi-layer perceptron as the second embedding vector.

5. The method of claim 1, wherein the identifying of the training proxy vector includes identifying any one training proxy vector corresponding to the random style arbitrarily set for the training color photo and the shooting object in the training color photo among the plurality of proxy vectors.

6. The method of claim 5, wherein the shooting object in the training color photo is identified by inputting the second training black-and-white photo into an object classification neural network in the first neural network.

7. The method of claim 1, wherein the second neural network includes an encoder extracting a feature from the training color photo, and converting the distribution of the second embedding vector into the distribution of the training proxy vector, and a decoder outputting the pixel-wise weight from the feature extracted from the encoder and the converted distribution of the second embedding vector.

8. The method of claim 7, wherein the second neural network further includes a fully connected layer (FCL) that extracts feature maps from the second embedding vector and the training proxy vector, respectively, and the encoder converts a distribution of the feature map for the second embedding vector into a distribution of the feature map for the training proxy vector.

9. The method of claim 8, wherein the encoder converts the distribution of the feature map of the second embedding vector into the distribution of the feature map of the training proxy vector according to [Equation 1] below, $$\mathcal{F}' = \sigma_t \left( \frac{\mathcal{F} - \mu_s}{\sigma_s} \right) + \mu_t \qquad \text{[Equation 1]}$$

($\mathcal{F}'$ represents the feature map for the second embedding vector, $\mathcal{F}'$ represents the feature map for the second embedding vector, $\mu_s$, $\mu_t$ represent a mean and a distribution of the feature map for the second embedding vector, respectively, and $\mu_t$, $\sigma_t$ represent a mean and a distribution of the feature map for the training proxy vector, respectively).

10. The method of claim 1, wherein the pixel-wise weight is a bilateral grid type weight for a pixel-wise gradation value of the training color photo.

11. The method of claim 1, wherein the training of the second neural network includes training the second neural network so that a difference between the decolorized image created by multiplying a pixel-wise gradation value of the training color photo by the pixel-wise weight, and a ground truth (GT) black-and-white photo into which the training color photo is converted according to the random style becomes minimal.

12. The method of claim 1, wherein the converting into the black-and-white photo includes converting the target color photo into a grayscale image, and inputting the grayscale image into the first neural network, and inputting a proxy vector corresponding to the target style into the second neural network, and converting the target color photo into the black-and-white photo.

* * * * *